Oct. 18, 1960  D. L. KOCH  2,956,842
JOURNAL LUBRICATING DEVICE
Filed Aug. 16, 1957  2 Sheets-Sheet 1
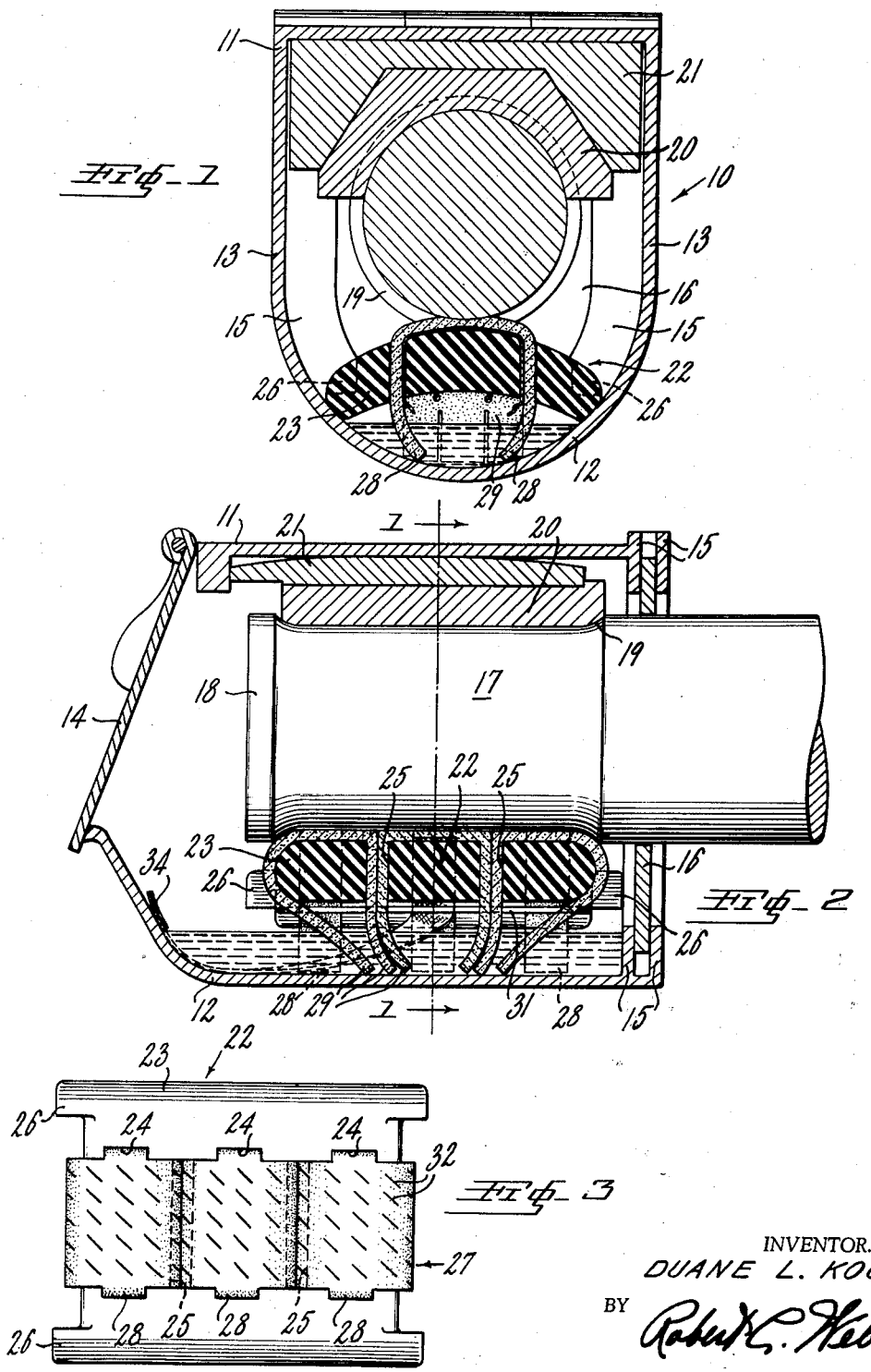
INVENTOR.
DUANE L. KOCH
BY
ATTORNEY Oct. 18, 1960     D. L. KOCH     2,956,842
JOURNAL LUBRICATING DEVICE
Filed Aug. 16, 1957                        2 Sheets-Sheet 2
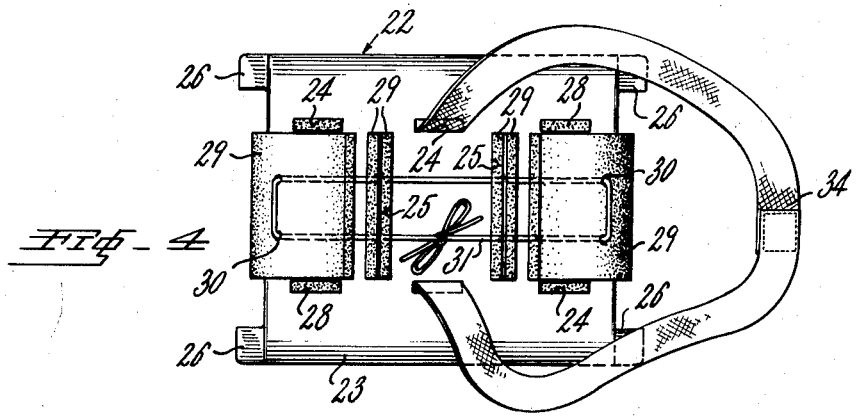
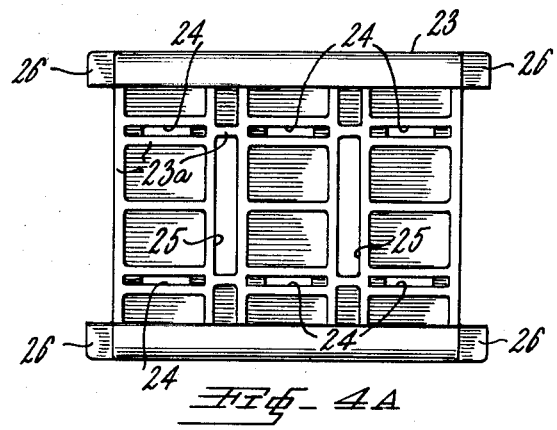
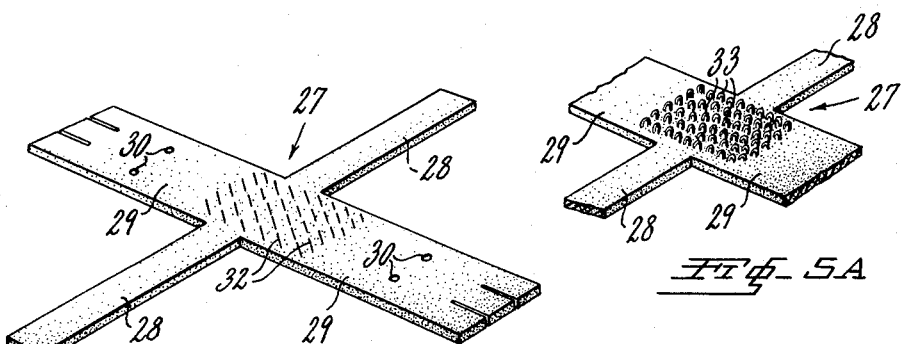
INVENTOR.
DUANE L. KOCH
BY Robert C. Weber
ATTORNEY

United States Patent Office 2,956,842
Patented Oct. 18, 1960

2,956,842

JOURNAL LUBRICATING DEVICE

Duane L. Koch, Fort Wayne, Ind., assignor to United States Rubber Company, New York, N.Y., a corporation of New Jersey Filed Aug. 16, 1957, Ser. No. 678,621

5 Claims. (Cl. 308—87)

This invention relates to improvements in journal lubricating means, and more particularly to an improved device adapted to be inserted into a container, such as a railroad car journal box, for lubricating a journal rotating relative to a partial bearing therein.

For many years the provision of an effective and economical means for lubricating such railroad car journals and bearings has been an important problem in the railroad industry. The inadequacy of such lubrication has unduly limited the speed and length of non-stop runs, especially freight hauls, while the frequent failure of such lubrication has resulted in the familiar "hot box," with its ensuing loss of time and money.

In the early development of the art, most railroad car journals were lubricated by packing oil saturated masses of yarn, commonly called "waste," between the journal and the bottom of the box, the lubrication being supplied by capillary attraction. However, this type of lubrication is subject to a serious defect, known in the trade as "waste grab." Such a condition most frequently occurs during switching operations, when the car is subjected to sudden stops, starts and shocks, causing the journal to be displaced relative to its bearing. This distorts the waste packing and causes it to bunch unevenly on one side of the box. Thereafter, as the journal rotates, it sweeps up this displaced waste and forces it to one side of the bearing, thereby cutting off the oil supply and eventually resulting in a "hot box."

Some of the more recent attempts to overcome this problem have led to the adoption of lubricating devices utilizing oil resistant sponges and fibrous wicking material. In all known instances these devices, at least when installed, are characterized by a relatively large, concave, wicking surface contacting a considerable portion of the journal circumference, the spongy material substantially filling and/or closing off the space in the box below the journal.

While the use of such devices represents a definite improvement over the conventional waste packing, such as the substantial elimination of "waste grab," they too have certain inherent disadvantages, as follows:

First, such devices develop an excessive amount of heat between the bearing and the rotating journal which greatly limits their lubricating ability. The cause of this appears to be the undue amount of friction generated between the rotating journal and the lubricator; the two contributing factors being the large, concave surface in contact with the journal, and the excessive pressure exerted against the journal by the rather large and cumbersome, oil saturated sponge. This pressure is further aggravated by parasitic absorption of oil, causing the sponge to swell considerably and set up with age.

Secondly, some of these devices need too frequent oiling to be of practical use, because the excess oil wiped off the journal cannot return to the bottom of the box through the saturated sponge. Thus, this oil accumulates at the top of the lubricator and either runs out or is splashed out of the journal box.

Third, these devices will not provide adequate lubrication over an extended period of time. One obvious reason for this is the above mentioned oil loss. Another is the insufficient number and excessive length of passages provided in the sponge for the wicking action (capillary attraction) to take place through the wicking elements, thereby unduly increasing the distance and fluid head required for the oil to travel from the bottom of the box to the journal.

Fourthly, these prior art devices are too critical in size to be adapted to fit in the various types and sizes of journal boxes and still make proper contact with and exert proper pressure against the various size journals presently encountered in practice. For example, for a 5½" x 10" size integral, separable bolted, or pedestal type journal box, the journals may actually vary from 5" to 5½" in diameter, while the actual dimensions of the box itself will also vary considerably. Thus, there are many possible combinations of sizes to be coped with. As a practical matter however, the varying space left in a particular size box for the lubricator can be conveniently broken down to three basic sizes: minimal (large journal—small box), nominal (standard journal and standard box), and maximal (small journal—large box). To design these prior art devices for acceptable operation even in these three different spaces is a practical impossibility. For one thing, to stay put, these devices must conform closely to the inner shape of the journal box. Granted that this can be accomplished, there is no guarantee that any particular size journal will come with the box. Thus, the chances are that there will either be too much contact with and pressure against the journal, or none at all. Even under the most favorable circumstances of a proper fit all around, in time the parasitic absorption of oil will cause the sponge to swell and set up, thereby unduly increasing the pressure against the journal and causing it to "run hot," as noted above. In some cases, there is also a tendency for such a device to settle away from the journal because of compression set and loose contact with the journal, thereby causing the latter to "run hot."

Accordingly, it is a general object of the present invention to provide an effective and economical means for lubricating such railroad car journals and bearings, thereby substantially extending the present limits on speed and length of runs, while substantially eliminating the occurrence of "hot boxes," caused by improper lubrication.

Another object of this invention is to provide an improved journal lubricating device so constructed and arranged that the proper bearing temperature will be maintained by reducing both the area of contact between the lubricator and the journal and the pressure exerted by the lubricator against the journal to the practical minimum, consistent with proper lubrication.

Another object of this invention is to provide an improved journal lubricating device so constructed and arranged that the possibility of oil loss and frequency of oiling are substantially reduced by facilitating the return of the excess oil, wiped from the journal, to the bottom of the journal box.

Another object of this invention is to provide an improved journal lubricating device so constructed and arranged that it will provide adequate lubrication over an extended period of time by substantially reducing the possibility of oil loss and frequency of oiling; by substantially reducing the length and increasing the number of passages provided for capillary attraction; by substantially increasing the capacity and height of the oil reservoir in the journal box, thereby substantially reducing the distance and fluid head required for the oil to travel from the bottom of the journal box to the journal, and by providing means for storing reserve oil within the lubricating device itself.

Another object of this invention is to provide an improved journal lubricating device so constructed and arranged that it is readily adapted to fit in the various types and sizes of journal boxes and to make proper lubricating contact with the various sizes of journals presently encountered in practice.

Other objects of this invention are to provide an improved journal lubricating device so constructed and arranged that it (1) readily reflects under light load; (2) permits easier inspection and maintenance of oil level; (3) can easily be installed or removed by hand without the use of any tools or the necessity of jacking up the journal box and removing the bearing and wedge; (4) can be inserted into the box with either end first; (5) protects the wicking material from rubbing against the rear of the journal box; (6) substantially reduces or eliminates parasitic absorption of oil; (7) lubricates the fillet and collar at the ends of the journal; (8) becomes more firmly secured in the box on deflection; (9) prevents seizure of the wicking material to the journal and subsequent displacement of said material; (10) compensates for bearing, journal and wedge wear; (11) performs satisfactorily in freezing temperatures, and (12) reduces maintenance requirements to the minimum.

Still other objects and advantages of this invention will become apparent upon consideration of the following specification and claims, when read in conjunction with the accompanying drawings wherein:

Fig. 1 is a cross-sectional view taken on line 1—1 of Fig. 2, and illustrates a journal box having a lubricating device constructed in accordance with the present invention;

Fig. 2 is a longitudinal sectional view of said journal and lubricating device;

Fig. 3 is a top plan view of said lubricating device;

Fig. 4 is a bottom plan view of said lubricating device;

Fig. 4A is a bottom plan view of a modification in the resilient body of said lubricating device;

Fig. 5 is a perspective view of one of the wicking elements employed in said lubricating device; and Fig. 5A is a partial perspective view illustrating a modification of one of said wicking elements.

Referring to the drawings, particularly Figs. 1 and 2, the reference numeral 10 generally indicates a conventional, integral type, journal box having a top 11, semicylindrical bottom wall 12, side walls 13, a front cover 14, and ribs 15 at its rear for retaining a dust seal 16. Within box 10, a journal 17, having a collar 18 and fillet 19, rotates relative to a partial bearing 20, the latter being held in place by a wedge 21. Between journal 17 and the bottom of box 10 is located the lubricating device embodying the present invention, and this is indicated generally at 22.

The lubricator 22 comprises a lubricant resistant and resilient, arch-shaped body 23, which is preferably molded to shape from an absorbent (i.e., spongy) or solid plastic material. The term "plastic material," as used herein, includes natural or synthetic rubber, as well as suitable thermosetting or thermoplastic materials, for example, polyurethane. The preferred material is neoprene rubber because of its oil and acid resistant qualities. When absorbent or spongy neoprene is used, the preferred formula can readily be determined by reference to A.S.T.M. designation D–1056–54T, grade SC11BF$_1$L, while the preferred formula for the solid neoprene can also be determined by referring to A.S.T.M. designation D–735–55T, grade SB515BF$_2$G. It is to be understood, however, that any other suitable plastic material of a resilient and lubricant resistant nature, particularly one which is resistant to railroad journal lubricating oil, can be used. If desired, body 23 may also be reinforced by a steel spring (not shown) embedded therein.

As also seen in Figs. 3, 4 and 4A, body 23 is provided with a plurality of longitudinal slots 24 and transverse slots 25 for securing the wicking material, as well as with lugs 26 at each end to protect the wicking material from rubbing against the rear of journal box 10. In addition, lugs 26 permit lubricator 22 to be inserted into box 10, either end first, and serve to properly locate the lubricator longitudinally of journal 17, by engaging the innermost dust seal retaining rib 15, as seen in Fig. 2.

Referring to Fig. 4A particularly, it will be noted that the underside of body 23 is hollowed out, in contrast to the full underside illustrated in Fig. 4, and is provided with an integral, interconnected, reinforcing rib-like structure generally indicated at 23a and framing slots 24 and 25. When the slightly more flexible, absorbent material is used, body 23 is preferably molded with the full underside, as shown in Fig. 4, since weight and amount of material used are not important factors; while, when a solid material is used, body 23 is preferably molded with a hollowed out and rib-reinforced underside, as shown in Fig. 4A, in order to save on weight and quantity of material used, as well as to obtain maximum flexibility. Alternatively, when the solid material is used, the arch-shaped body could be made hollow, being either inflatable with or containing a trapped fluid, such as air, in order to save on weight and material, as well as increase flexibility.

In addition, the use of each type of material has certain other advantages and disadvantages. For example, the absorbent material can be used as an extra reservoir of oil, while the solid material cannot. Secondly, the spongy material, being softer and slightly more flexible, will adjust a little better to irregularities in the size and shape of the journal box, at the points of contact therewith. On the other hand, the solid material is not subject to parasitic absorption of oil, while the absorbent material is. However, this problem is substantially controlled in the present invention by cutting down appreciably on the amount of sponge material employed, and by predesigning the shape and deflection characteristics of the arch so that the relatively small amount of swelling and setting of the sponge is compensated for, ahead of time. Thus, any undue increase in the pressure exerted by the lubricator against the journal will be prevented. This cannot be done in prior art devices and still maintain the required initial contact with the journal, for two reasons. First, the amount of sponge material employed is much greater, and so will be the degree of swell. Second, such prior art devices must conform closely to the shape of the journal box to stay in place and are designed to conform closely to the journal too; thus, most of the swelling will occur upwardly toward the journal. This is not true with the relatively thin, convexly arched lubricator 22 of the present invention, as the relatively small amount of swelling can be more evenly distributed throughout the arch, which does not conform closely either to the journal or the box, and which readily deflects under light load, as will be pointed out more in detail below.

Referring to Fig. 5, the lubricating means preferably employed comprises a plurality of wicks 27 (only one being shown), each preferably cut into the shape of a cross. If desired, the wicks 27 could be made from one piece in the shape of a plurality of crosses laid end to end, longitudinally. The wicks 27 are preferably made from wool felt, although other suitable materials, including woven fabric, could be used. Each of the wicks 27 is preferably composed of narrow, lateral streamers 28, and wide, longitudinal streamers 29, the latter having each end slit (although the ends of streamers 28 could also be slit to increase the surface area exposed to the lubricating oil for greater wicking action. The streamers 29 are also provided with holes 30 for receiving cord 31, as will be described more in detail below.

In the center, each wick 27 is preferably provided with a series of serrations or slits 32 for increasing the supply of oil at the surface of the journal. As will be evident from a reference to Figs. 1 and 3, serrations 32 are preferably staggered and disposed in rows at a 45° angle to the longitudinal axes of the lubricator 22 and journal 17, for maximum coverage and lubrication of the journal. In addition, or alternatively to slits 32, and as seen in Fig. 5A, each wick 27 may be provided with tufts 33, made of cotton cord and loop stitched through its center portion. As is well known in the art, cotton will wick oil faster than wool. Thus, tufts 33 provide an excellent supplement to the main wicking action and oil storage function of wicks 27. Also, because of the open, pile-like surface presented, tufts 33 serve to further reduce the area of contact and friction between lubricator 22 and journal 17, as compared to the relatively solid, upper surface of wicks 27. Furthermore, the upper surfaces of the center portions of wicks 27 could be singed or sanded to remove the fuzz, or these center portions could be impregnated with silicone to reduce linting. This prevents the breaking off of small pieces of the wicking material which might be picked up by the journal and eventually become wedged in between the bearing and journal, thereby interfering with proper lubrication thereof.

Referring once again to Figs. 1–4, body 23 and wicks 27 are assembled by inserting streamers 28 through slots 24 and streamers 29 through slots 25, the latter being wide enough for the two streamers 29 of adjacent wicks 27. As will be apparent, both streamers 29 of the central wick 27 are inserted in slots 25, while one streamer 29 of each outer wick 27 is wrapped around the ends of body 23. These last mentioned streamers 29 lubricate the collar 18 and fillet 19 at the ends of journal 17, as clearly shown in Fig. 2. As noted above, wicks 27 could be made in one piece, the adjacent streamers 29 being continuous and extending through slots 25 in loops (not shown). These loops, which would rest on the bottom of box 10, could be opened up below body 23 and filled with additional wicking material to capture more oil.

The final assembly step consists of threading the cord 31 through the holes 30 of each streamer 29 and tying them together at the underside of body 23, as shown in Fig. 4. This anchors the wicks 27 firmly to body 23, thereby substantially reducing the possibility of seizure of the wicks 27 to the journal, and subsequent displacement of the wicks during service. In addition, the tying down of streamers 29 insures their immersion in the oil reservoir at the bottom of box 10 for proper wicking action. Moreover, each of streamers 28, 29, act as baffles in the bottom of box 10, to prevent the oil therein from sloshing around or being lost out of the box.

It has also been found desirable to provide lubricator 22 with a pull tab 34, to facilitate removal of the lubricator from journal box 10. As best seen in Figs. 2 and 4, pull tab 34 is in one piece, and is threaded through slots 24 of body 23 before inserting streamers 28 of central wick 27; then, the ends of pull tab 34 are preferably stitched together to form a loop to facilitate grasping the same. The pull tab 34 is preferably constructed of woven cotton tape for strength, the cotton acting as a supplemental wicking agent.

The assembled lubricator is now soaked in oil to thoroughly wet wicks 27, and/or tufts 33 as well as body 23, when the absorbent material is used therefor. Next, lubricator 22 is inserted into journal box 10, this operation being quickly and easily performed by hand, because of the ease with which the arch-shaped body 23 deflects. No tools of any kind are needed, nor is it necessary to jack up box 10 and remove bearing 20 and wedge 21, as required by many prior art devices. The same is true for the removal of lubricator 22. As a matter of fact, when pull tab 34 is used, removal is further facilitated because a light pull thereon will quickly dislodge lubricator 22, it only being necessary to locate the loop formed by the stitched ends of pull tab 34 at the front end of box 10 during the insertion step, as shown in Fig. 2. Furthermore, the operator has no difficulty in correctly positioning lubricator 22 in box 10, because the sides of arch-shaped body 23 are designed to contact the bottom wall 12 of the box, while lugs 26 are designed to abut innermost rib 15 at the rear of the box.

Once lubricator 22 is properly located in box 10, the latter may be filled with oil to the proper level. As shown in Figs. 1 and 2, the box 10 is preferably filled to a height slightly below the lowest part of ribs 15. At this level, box 10 contains the maximum amount of oil without undue risk of loss through either the front or rear of the box. In addition, the level of the oil can readily be determined by visual inspection and the proper level maintained, there being no part of lubricator 22 extending over the oil in the front of box 10 to block such view or interfere with the filling operation.

The lubricator 22 is now ready for operation. As journal 10 rotates, wicks 27 and/or tufts 33 feed the oil to its surface by capillary attraction. Whenever an absorbent material is used for arch-shaped body 23, this primary lubricating action is supplemented by deflection of the body, which squeezes some oil onto wicks 27. This occurs during up and down movement of journal 17 relative to bearing 20, as when the car passes over uneven rails, switches and the like.

Referring particularly to Figs. 1 and 2, it will be seen that the arch-shaped lubricator 22 extends substantially convexly relative to (i.e., curves away from) journal 17 throughout its length, and that there is only a very small area of contact between the wicks 27 and the circumference of journal 17. As will also be apparent, this presentation of a substantially convex lubricating surface extending lengthwise of the journal actually reduces the area of contact therewith to the practical minimum consistent with adequate lubrication. As noted above, this practical minimum can be made even lower when tufts 33 are used. Likewise, it will be noted that arch-shaped body 23 extends across and above the bottom wall 12 of box 10, with only the sides of the body contacting the bottom wall, and that the only other contact is between lugs 26 and rib 15 at the rear of the box, thereby leaving the remaining space in the box below journal 17, completely open. Furthermore, the arch of body 22 is so shaped that continuous contact will be maintained with journal 17 for adequate lubrication, but it is also sufficiently flexible that the lubricator will readily deflect under light load. Thus, the pressure exerted by lubricator 22 against journal 17 is also reduced to the practical minimum consistent with adequate lubrication. By so reducing both of these factors, i.e., the lubricating contact area and the lubricator pressure against the journal, the friction generated at the journal lubrication area is correspondingly reduced. This, then, permits maintenance of proper bearing temperature, with attendant increases in both speed and length of non-stop hauls, and represents a substantial improvement over the previously mentioned prior art devices.

A further examination of Figs. 1 and 2, will reveal that arch-shaped lubricator 22 has many additional important advantages. For example, any excess oil, which is wiped from journal 17 and might tend to accumulate at the top of lubricator 22, can easily find its way back to the bottom of box 10, at either end of the lubricator. Thus, the possibility of oil loss and the necessity of frequent oiling, common to some of the aforesaid prior art devices, are substantially reduced. It will also be noted that lubricator 22 is provided with at least eight, short passageways 24, 25 for the wicking elements 28, 29 to ensure a sufficient supply of lubricant to journal 17. Furthermore, the arch-shaped lubricator 22 provides the practical maximum in oil reservoir height and capacity, thereby substantially reducing the distance and fluid head required for the oil to travel from the bottom of box 22 to journal 17. In addition, laboratory tests indicate that lubricator 22, particularly when a spongy body 23 is employed, will lubricate satisfactorily for a long period even after all oil in the reservoir at the bottom of the box has been depleted, because of the ability of wicks 27 and spongy body 23 to store a substantial quantity of oil. Thus, the combination of these features results in the provision of adequate lubrication over an extended period of time, not obtainable with the above mentioned, prior art devices.

Another important advantage of lubricator 22 is that it is readily adapted to fit in a variety of sizes and types of journal boxes and still make proper lubricating contact with the various sizes of journal presently encountered in practice. To accomplish this, lubricator 22 is preferably made large enough to fit in the maximal space provided by a small journal and a large box, and to automatically compensate for bearing, journal and wedge wear. However, when lubricator 22 is required to fit in the standard space, and even in the minimal space, there will be no undue increase in pressure against, or area of contact with the journal. This is true because of the arch shape of lubricator 22 which initially reduces the area of contact with both the journal and the box to the practical minimum, and because of the ease with which lubricator 22 deflects under light load. As pointed out previously, such design is not practically possible with the aforesaid prior art devices, which conform closely to the contour of both the journal and the box.

At this point it is well to mention that the deflection of lubricator 22 will not be interfered with by the oil below it, as the latter is free to flow to either end of box 10 during such deflection. In addition, the deflection of lubricator 22 has the further advantage of more firmly securing the lubricator in place. For example, should journal 17 be caused to shift downwardly and sideways relative to bearing 20, as induced by the shock of a sudden start or stop often encountered in switching operations, arch-shaped lubricator 22 will readily deflect and wedge the sides of body 23 outwardly against the bottom wall 12 of box 10. Likewise, the exposed central portions of wicks 27 and/or tufts 33 are wide enough to maintain proper lubricating contact during such movement. In this connection, it is also to be noted that lubricator 22 will perform satisfactorily even in freezing temperatures. In a recent test where the oil temperature was −60° F., with the journal rotating from a dead start, lubricator 22 was not dislodged from its position and lubricated properly. Thus, it can be seen that even under the most severe conditions, such as those pointed out above, lubricator 22 remains in position and functions properly, thereby reducing maintenance requirements to a minimum.

A further advantage of lubricator 22 is that it provides means for lubricating the collar 18 and fillet 19 at the ends of journal 17, and yet will not be harmed during lateral movement of the journal. As seen in Fig. 2, bearing 20 is slightly shorter than journal 17 to permit lateral movement of the journal, as when the car passes over a switch or rounds a sharp curve, and thereby prevent damage to either journal 17, bearing 20 or wedge 21. By making the length of body 23 substantially coextensive with bearing 20, and properly curving the ends of the body, wicks 27 can contact and lubricate the collar and fillet at the ends of journal 17. In addition, like bearing 20, body 23 is short enough so that it will not be crushed by the journal during its lateral movement.

From the foregoing it will be apparent that the lubricating device of the present invention does provide an effective and economical means for lubricating such railroad car journals and bearings. It will also be apparent that the invention is not limited to such use, but can readily be employed wherever there is a need for lubricating a journal rotating relative to a partial bearing.

Furthermore, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Having thus described my invention, what I claim and desire to protect by Letters Patent is:

1. An improved device adapted to be inserted into a railroad car journal box for lubricating a journal rotating relative to a partial bearing therein, said device comprising a resilient and lubricant resistant, arch-shaped body adapted to extend across and above the bottom of said box and having a substantially convex surface adapted to extend longitudinally of said journal in substantially convex relationship thereto, said body having a plurality of short, longitudinal and lateral passages therethrough and lugs at each end adapted to engage the rear of said box, a plurality of fibrous wicking elements located on said convex surface of said body and having a plurality of portions adapted to extend from a lubricant reservoir in the bottom of the box, said portions of said wicking elements extending, respectively, around the ends of said body between said lugs and through said passages onto said convex surface and said wicking elements being adapted to contact said journal substantially throughout its length, for lubricating said journal by capillary attraction, a cord passing through said portions of said wicking elements below said body and tying said portions together to secure said wicking elements to said body, and a pull tab connected to said body and adapted to extend toward the front of said box for facilitating removal of said device from said box.

2. In combination with a container enclosing a journal rotatable relative to a partial bearing in said container, a journal lubricator device comprising a resilient, arch-shaped body positioned within said container and extending across and above the lubricant reservoir-forming bottom of said container and having a substantially convex upper surface extending lengthwise of said journal in substantially convex relationship thereto, said body being provided with a plurality of short longitudinal and transverse passages therethrough, a plurality of wicking elements positioned on said convex upper surface of said body and contacting said journal substantially throughout its length, said wicking elements having a plurality of portions extending therefrom through said passages, respectively, and into said lubricant reservoir to lead lubricant therefrom to said journal by capillary attraction, means connecting said wicking element portions to one another below said body for securing said wicking elements to said body, and means connected to said body and accessible from the exterior of said container for facilitating removal of said device from said container.

3. The combination set forth in claim 2, said body of said journal lubricating device being further provided at that end thereof facing the rear wall of said container with a plurality of lugs engaging said rear wall of said container for accurately positioning said body and said wicking elements relative to said journal.

4. In combination with a container enclosing a journal rotatable relative to a partial bearing in said container, a journal lubricating device comprising a resilient, arch-shaped body positioned within said container and extending across and above the lubricant reservoir-forming bottom of said container and having a substantially convex upper surface extending lengthwise of said journal in substantially convex relationship thereto, said body being provided with a plurality of short longitudinal and transverse passages therethrough, a plurality of wicking elements positioned on said convex upper surface of said body and contacting said journal substantially throughout its length, said wicking elements having a plurality of portions extending therefrom through said passages, respectively, and into said lubricant reservoir to lead lubricant therefrom to said journal by capillary attraction, said body being further provided at that end thereof facing the rear wall of said container with a plurality of lugs engaging said rear wall for accurately positioning said body and said wicking elements relative to said journal, and means connected to said body and accessible from the exterior of said container for facilitating removal of said device from said container.

5. In combination with a container enclosing a journal rotatable relative to a partial bearing in said container, a journal lubricating device comprising a resilient, arch-shaped body positioned within said container and extending across and above the lubricant reservoir-forming bottom of said container and having a substantially convex upper surface extending lengthwise of said journal in substantially convex relationship thereto, said body being provided with a plurality of short longitudinal and transverse passages therethrough, a plurality of wicking elements positioned on said convex upper surface of said body and contacting said journal substantially throughout its length, said wicking elements having a plurality of portions extending therefrom through said passages, respectively, and into said lubricant reservoir to lead lubricant therefrom to said journal by capillary attraction, said body being further provided at that end thereof facing the rear wall of said container with a plurality of lugs engaging said rear wall for accurately positioning said body and said wicking elements relative to said journal, and means connecting said wicking element portions to one another below said body for securing said wicking elements to said body.

References Cited in the file of this patent

UNITED STATES PATENTS

| | | |
|---|---|---|
| 178,017 | McDonald | May 30, 1876 |
| 634,860 | Smith | Oct. 10, 1899 |
| 2,079,734 | Ditmore | May 11, 1937 |
| 2,150,935 | Miller | Mar. 21, 1939 |
| 2,213,001 | Gundel | Aug. 27, 1940 |
| 2,291,483 | Miller | July 28, 1942 |
| 2,571,235 | Hamer | Oct. 16, 1951 |
| 2,694,606 | Etzkorn | Nov. 16, 1954 |
| 2,713,524 | Hagy | July 19, 1955 |
| 2,807,803 | Rockwell | Sept. 24, 1957 |